Dec. 14, 1954   G. T. SUTCH   2,696,777
ROTARY BALER FOR CHOPPED HAY
Filed May 31, 1950   10 Sheets-Sheet 3
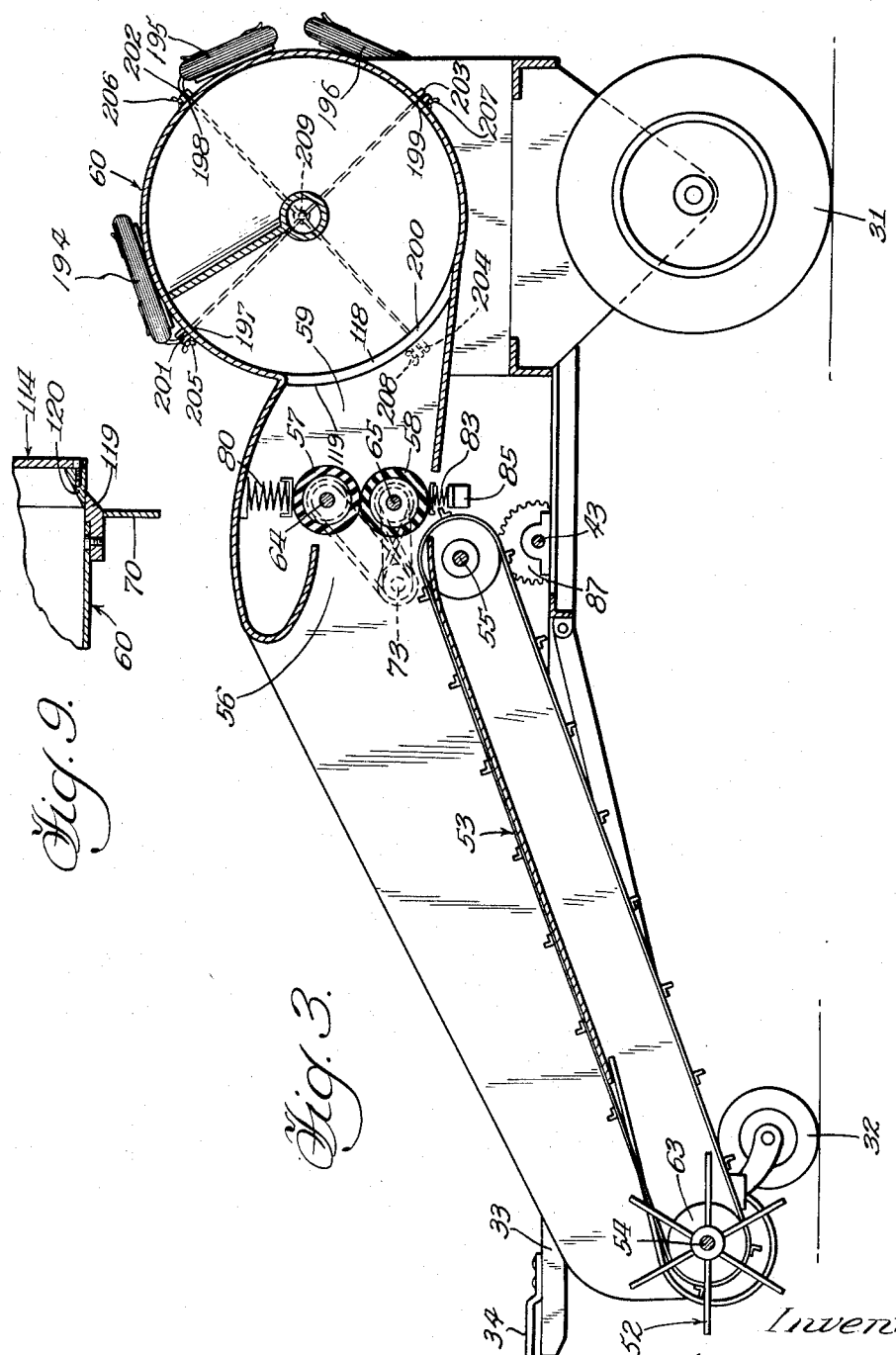

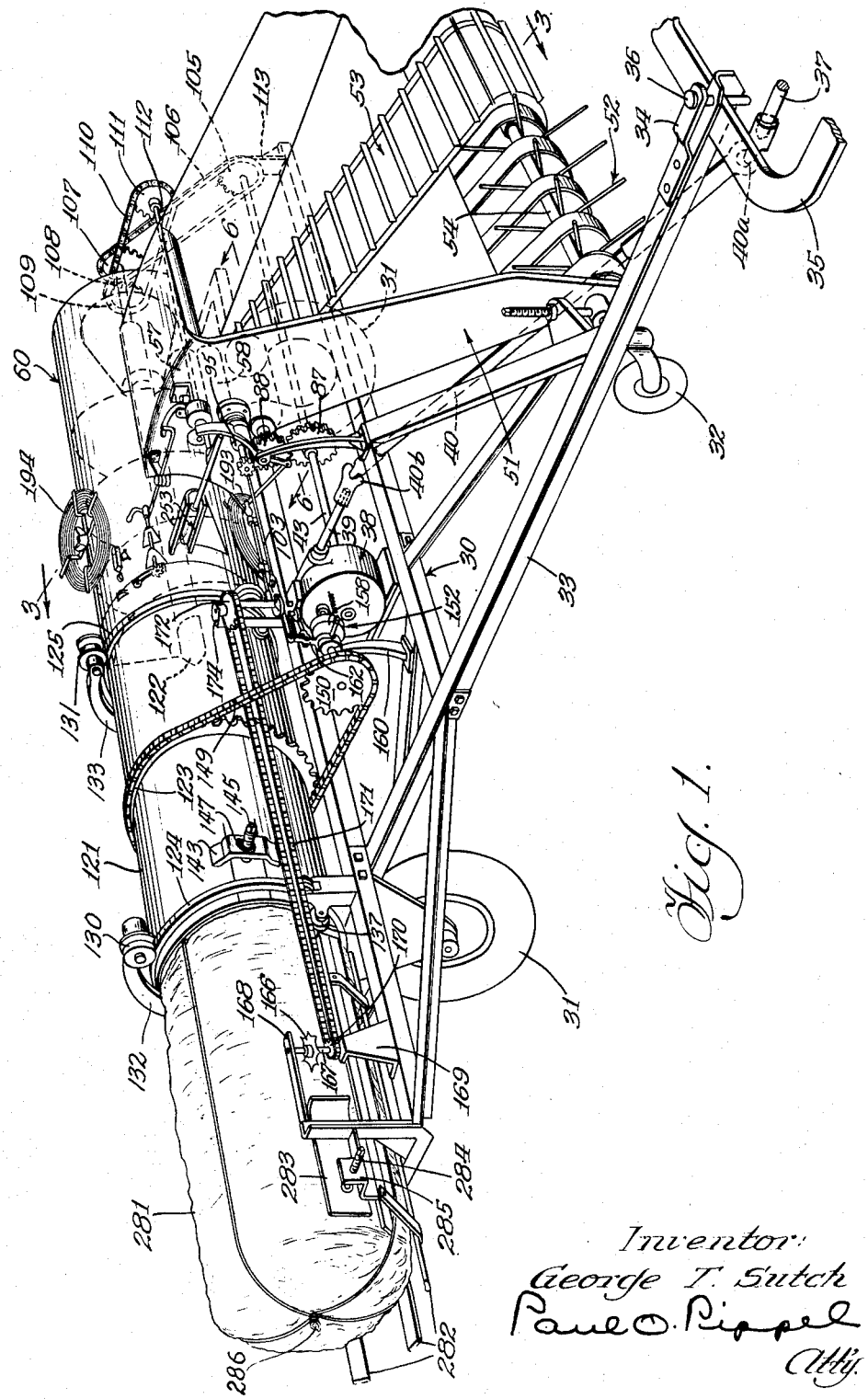

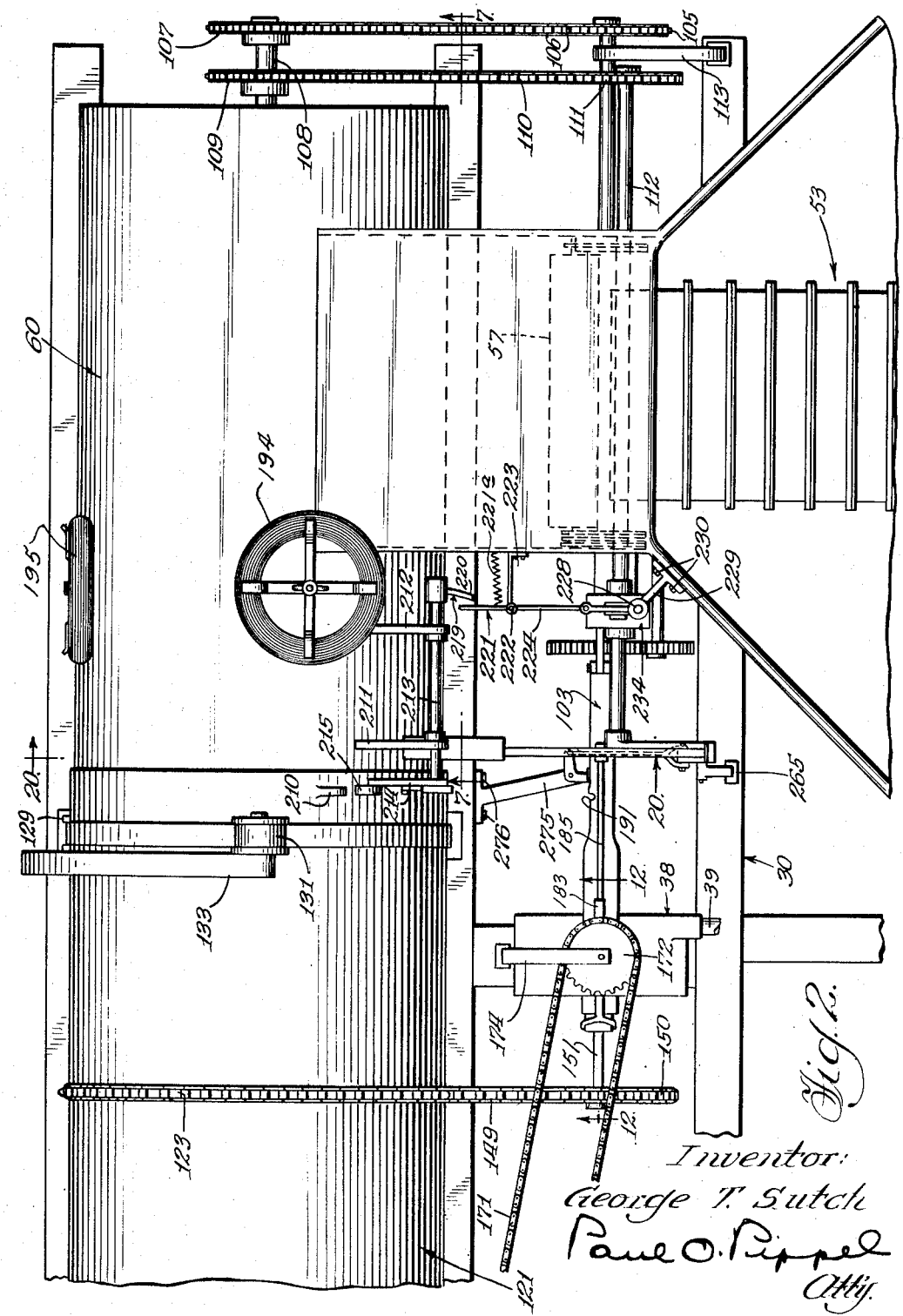

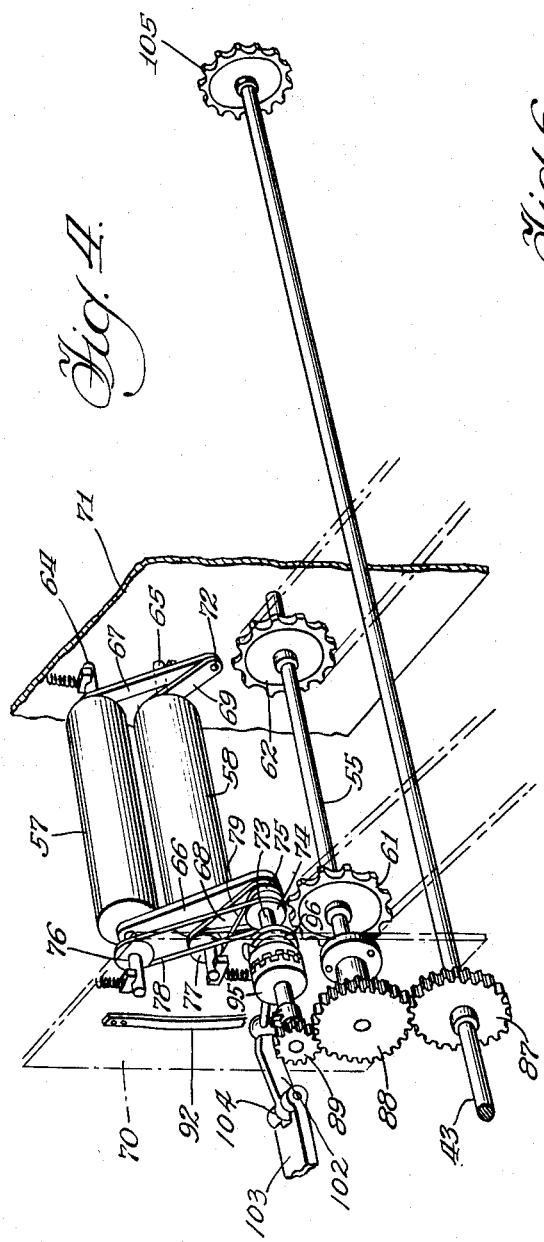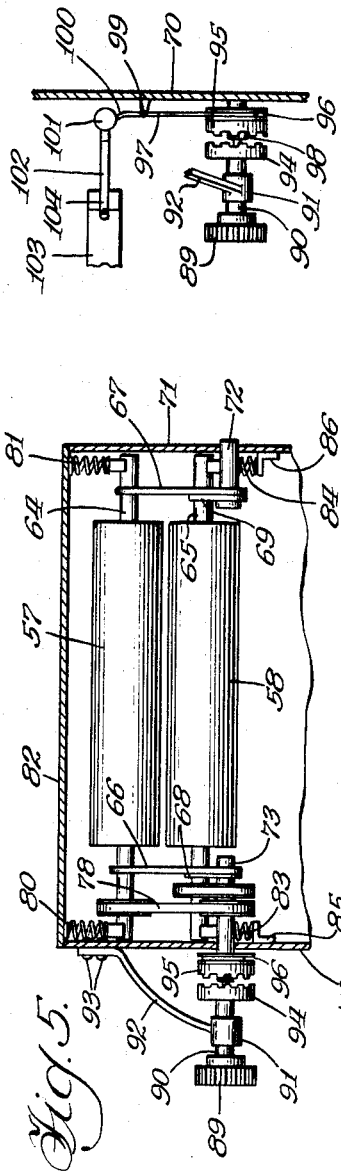

Dec. 14, 1954  G. T. SUTCH  2,696,777
ROTARY BALER FOR CHOPPED HAY
Filed May 31, 1950  10 Sheets-Sheet 5
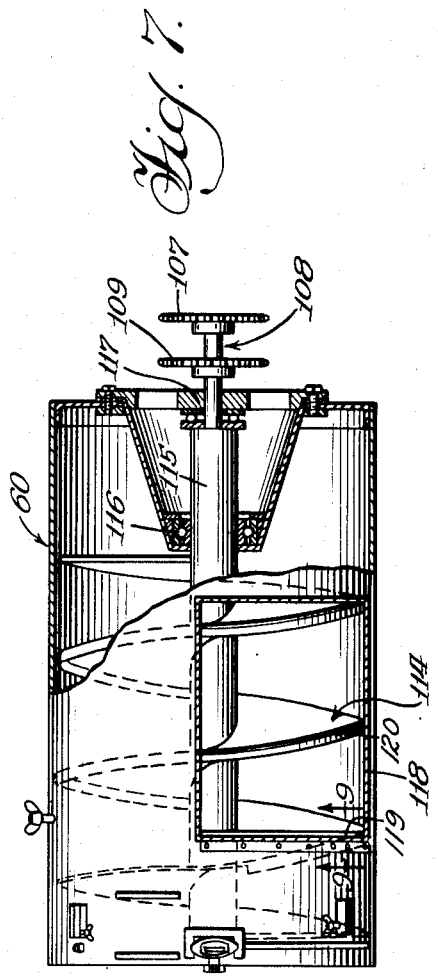
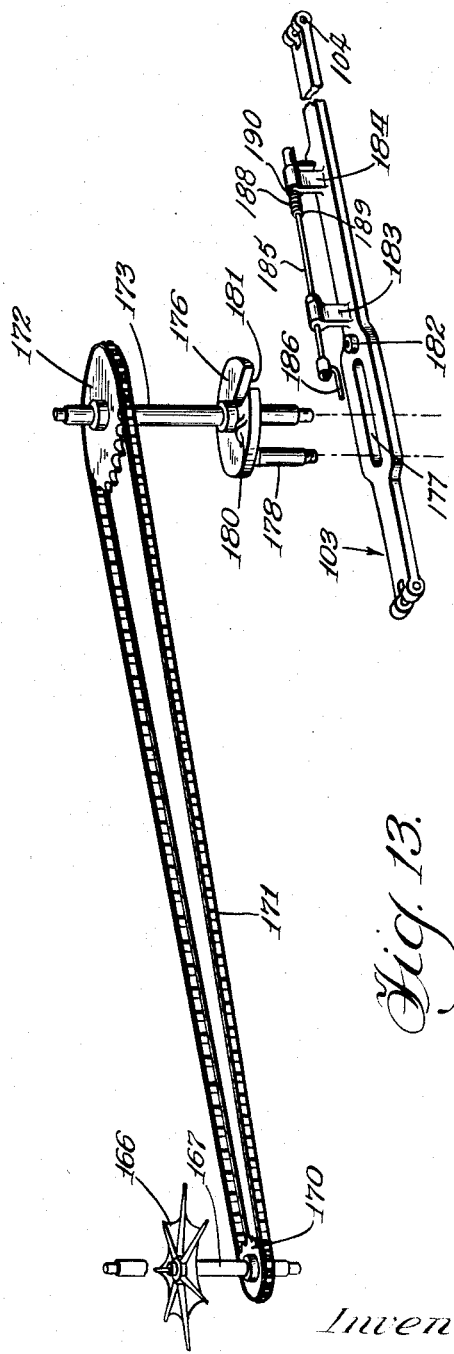
Inventor:
George T. Sutch

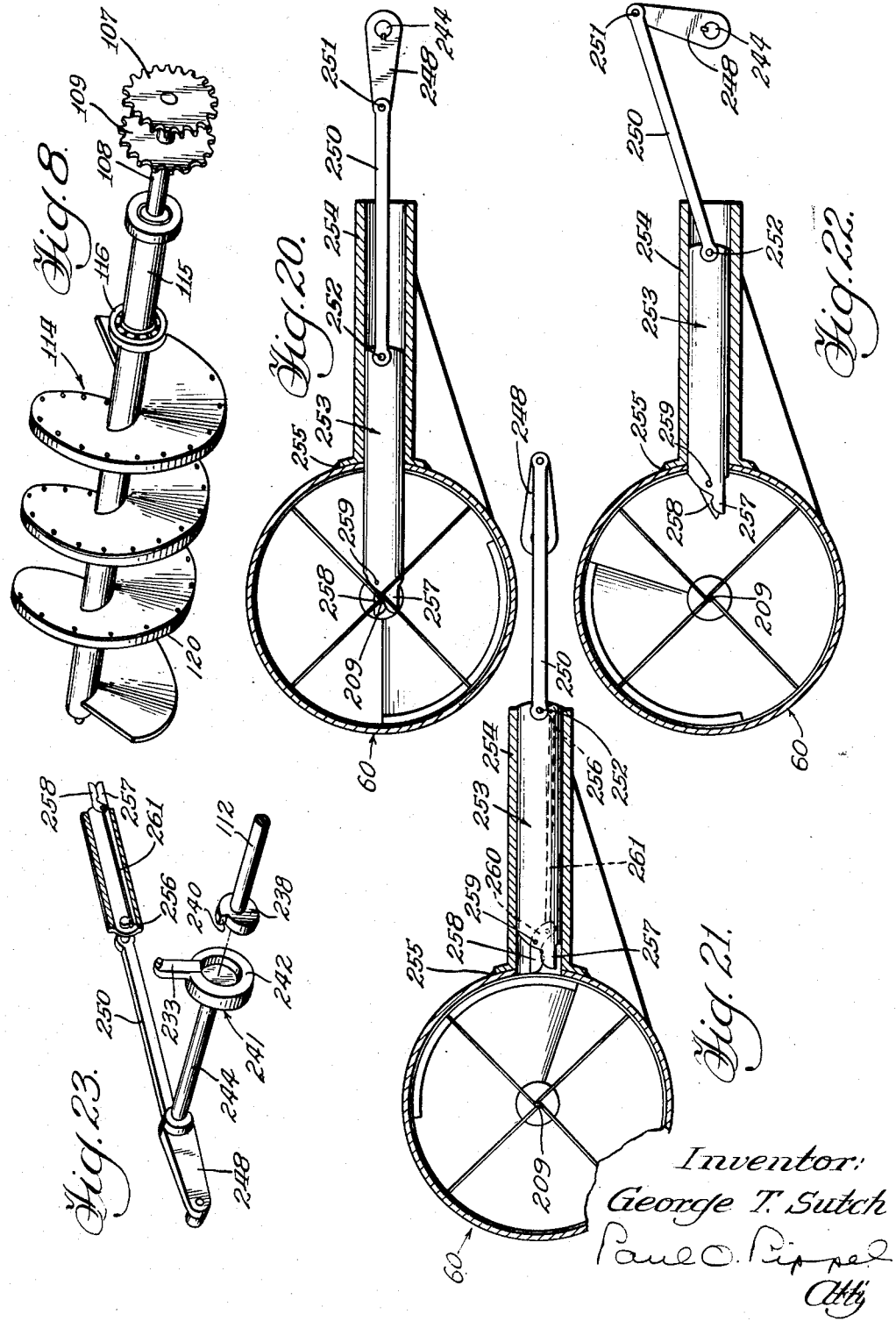

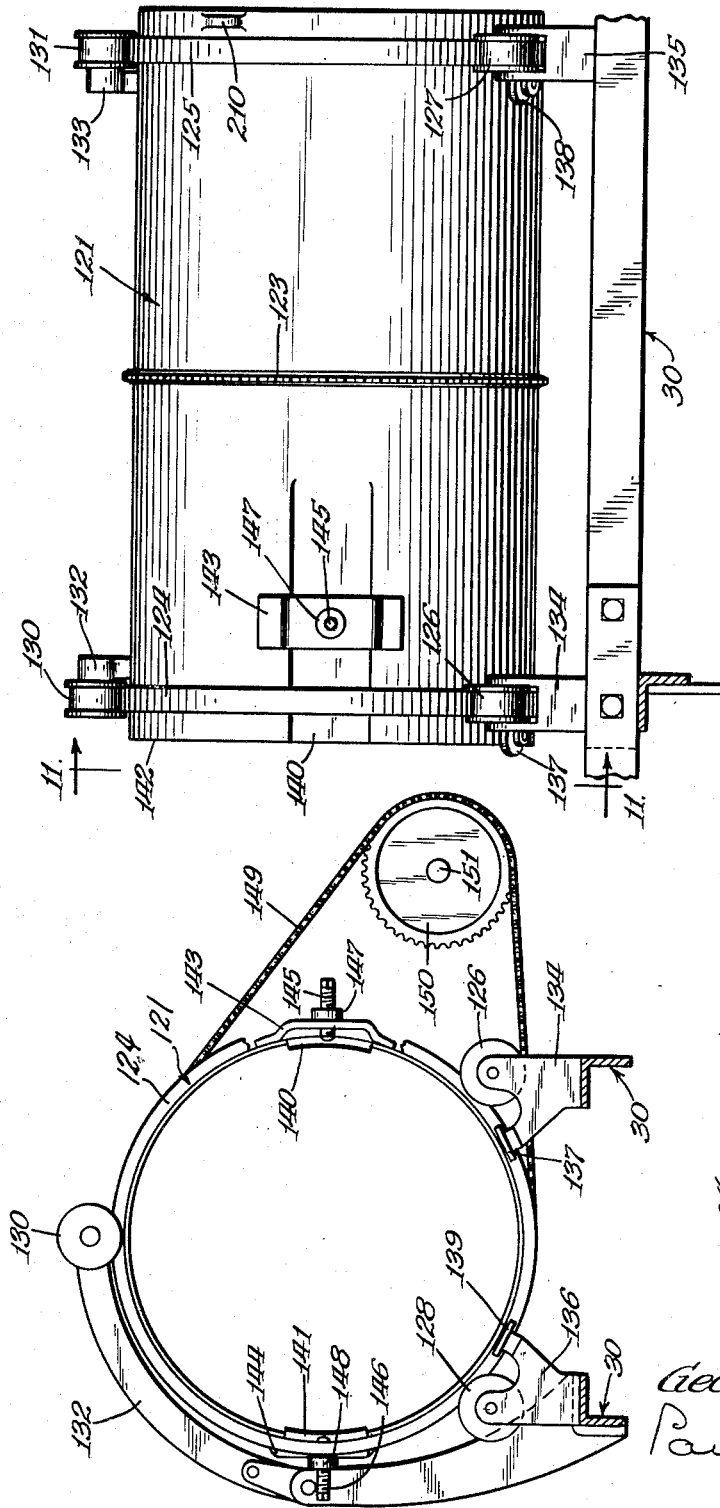

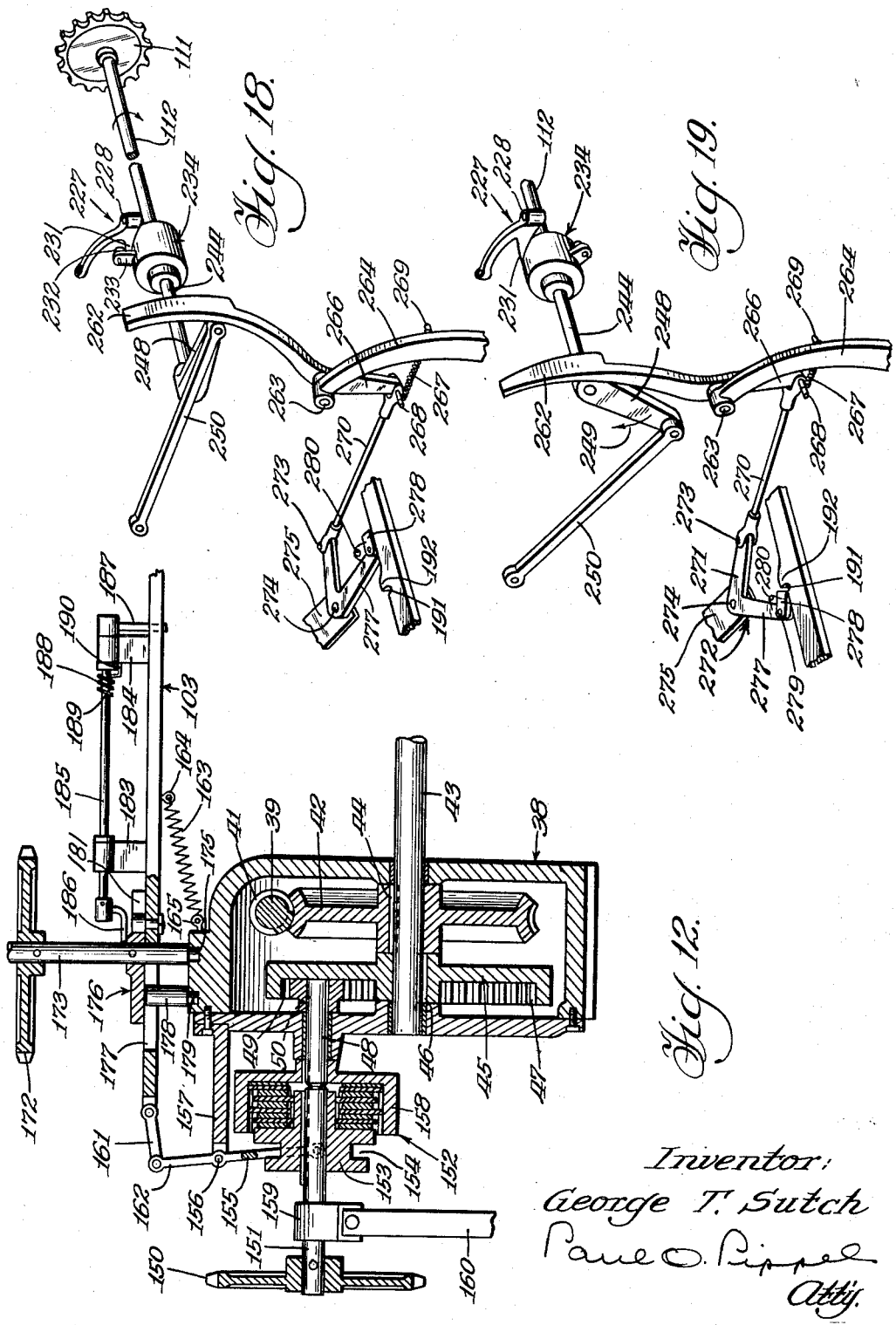

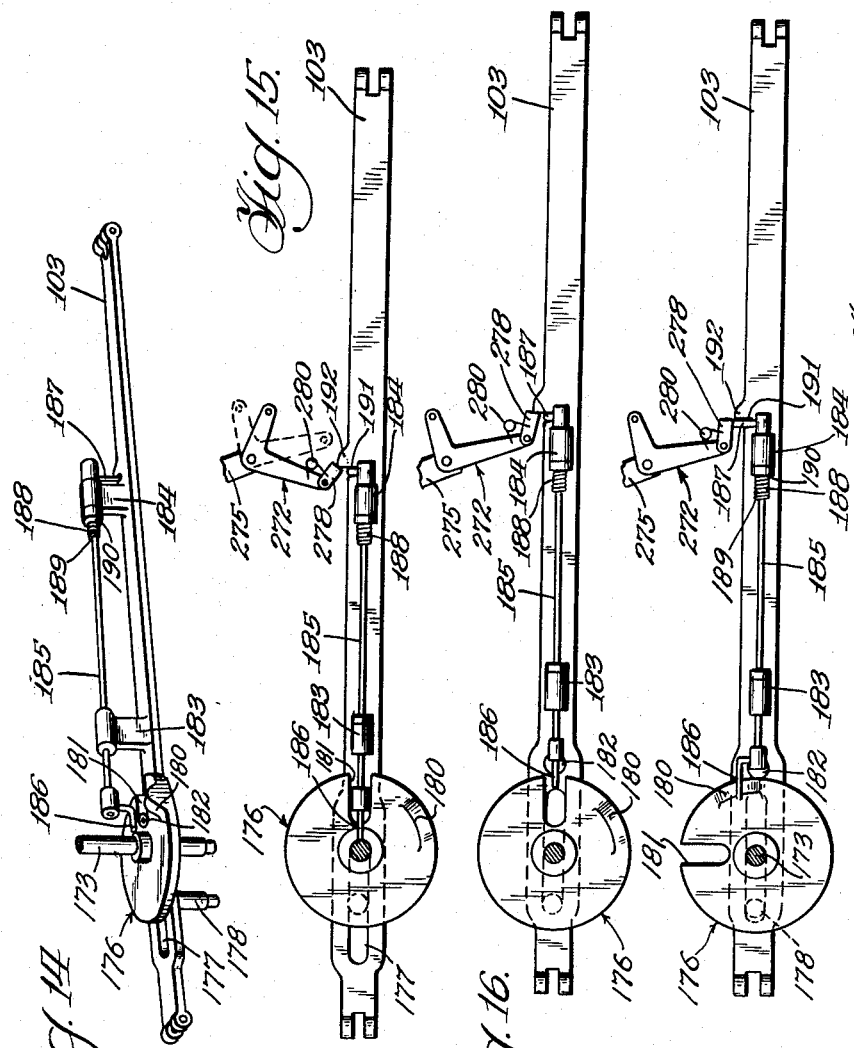

Dec. 14, 1954 G. T. SUTCH 2,696,777
ROTARY BALER FOR CHOPPED HAY
Filed May 31, 1950 10 Sheets-Sheet 10
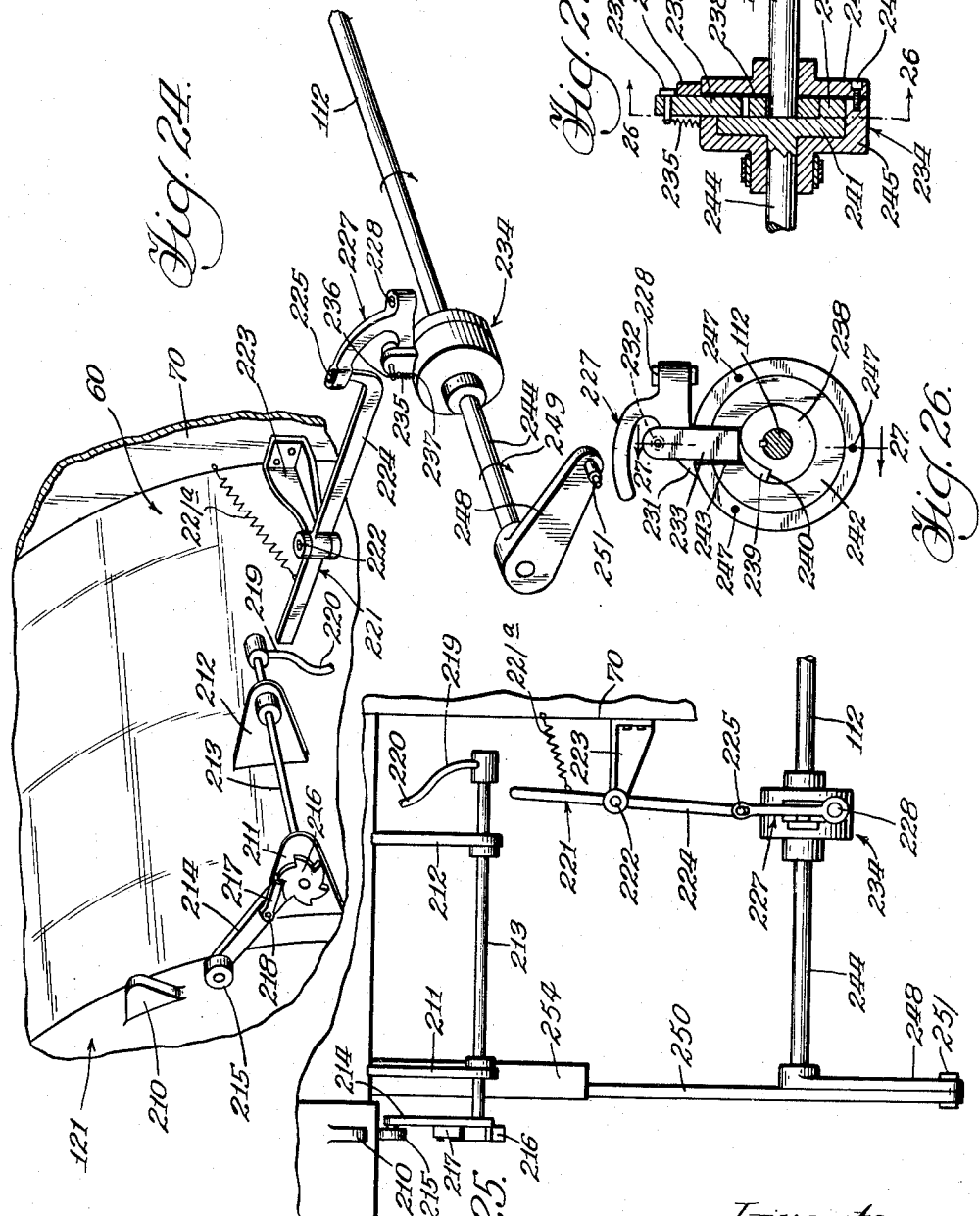
Inventor:
George T. Sutch
Paul O. Pippel
Atty.

United States Patent Office 2,696,777
Patented Dec. 14, 1954

2,696,777

ROTARY BALER FOR CHOPPED HAY

George T. Sutch, Lake Geneva, Wis., assignor to International Harvester Company, a corporation of New Jersey Application May 31, 1950, Serial No. 165,191

2 Claims. (Cl. 100—11)

This invention relates to a new and improved baler.

Balers, and more particularly hay balers of the pick-up type, are adapted to traverse a field in which hay has been put into windrows, picking up the hay and thereafter compressing it into a bale or bundle and finally tying the bale prior to discharge from the machine. The major problems in the baling operation are the means of compressing the hay or other material to be baled and the means of effecting a tie of the material in the compressed bale formation. In the past, baling machines have principally relied upon reciprocating plungers to cause hay compression. This reciprocating plunger motion requires a machine of a sturdy construction in order to withstand the constant intermittent shock of the plunger on its compression stroke.

The other major problem in baling machines lies in the mechanism for encircling a tie strand around a compressed bale and effecting a tie in the ends of the encircled tie strands. Present machines employ complex needle mechanism for carrying the strand about the formed bale and cooperative knot or twisting mechanism to accomplish the twist or tie.

An important object of this invention is to provide a pick-up hay baler having means associated with the bale forming chamber for rotating a portion thereof to automatically accomplish a tying of the compressed bale.

A further important object of this invention is the provision of means in a transversely disposed cylindrical baling chamber for baling machines in which a portion of the bale chamber is rotatable in cooperation with tie strand cutting means to automatically effect a complete typing of a formed bale without needle or knotter mechanisms.

Other and further important objects of this invention will become apparent from the disclosures in the following specification and accompanying drawings.

In the drawings:

Fig. 1 is a perspective view of the pick-up hay baler of this invention.

Fig. 2 is an enlarged fragmentary top plan view of the baler of Fig. 1.

Fig. 3 is a sectional view taken on the line 3—3 of Fig. 1 and shows the pick-up and feeding mechanism of the hay baler of this invention.

Fig. 4 is a diagrammatic perspective view with portions thereof broken away to show the cooperative feed rolls and the drive therefor.

Fig. 5 is a front elevational view of the rolls as shown in Fig. 4.

Fig. 6 is a top plan view detail of the feed-roll clutch mechanism of Figs. 4 and 5.

Fig. 7 is a front elevational view detail partially in section and taken along the line 7—7 of Fig. 2.

Fig. 8 is a perspective view detail of the auger compressor of this invention.

Fig. 9 is a sectional view taken along the line 9—9 of Fig. 7.

Fig. 10 is a front elevational view of the rotating drum portion of the bowl chamber.

Fig. 11 is an end view of the device as shown in Fig. 10 viewed along the line 11—11.

Fig. 12 is a transverse sectional view of the drive transmission of this hay baler taken on the line 12—12 of Fig. 2.

Fig. 13 shows a perspective view of the bale length measuring device and showing portions thereof in exploded relationship.

Fig. 14 is a perspective view of the clutch tripping mechanism.

Fig. 15 is a top plan view of the device as shown in Fig. 14.

Fig. 16 is a top plan view of the device of Figs. 14 and 15 showing the successive clutch tripping movement.

Fig. 17 is a top plan view of the clutch tripping mechanism shown in a subsequent position.

Fig. 18 shows a perspective view of the clutch reset mechanism.

Fig. 19 is another perspective view showing a successive movement view of the clutch reset mechanism.

Fig. 20 is a sectional view taken on the line 20—20 of Fig. 2 and showing the tie wire strand holding and cutting means.

Fig. 21 shows a sectional view similar to Fig. 20 with the wire holding means withdrawn from the bale chamber.

Fig. 22 is a sectional view similar to Figs. 20 and 21 wherein the wire holding and cutting means is shown entering the bale chamber.

Fig. 23 is a perspective view partially in section and partially exploded of the wire holding and cutting mechanism of this invention.

Fig. 24 is a perspective view showing the twist counter mechanism of this invention.

Fig. 25 is a top plan view of the mechanism as shown in Fig. 24.

Fig. 26 is an end view of the device as viewed on the line 26—26 of Fig. 27.

Fig. 27 is a sectional view taken on the line 27—27 of Fig. 26.

As shown in the drawings:

The reference numeral 30 indicates generally a frame supporting structure for the rotary baler of this invention. The baler and supporting structure includes relatively large widely spaced rear wheels 31 and relatively small caster wheel 32 mounted at the forward end of the machine. The frame 30 includes a hitch member 33 with a clevis 34 at the forward end thereof for attachment to a tractor draw-bar 35 by means of a pin 36 passing through the clevis and draw-bar.

The tractor (not shown in the drawings) is equipped with a rearwardly extending power take-off shaft 37 to impart rotational drive to a gear box 38 carried on the frame structure 30 for the transmittal of power to the baling elements. The gear box 38 includes a shaft 39 extending forwardly therefrom and through the medium of a connecting link 40 joined by universal joints or the like 40ᵃ or 40ᵇ to the power take-off shaft 37 and the gear box shaft 39. This gear 41 is in meshing engagement with a large worm type gear 42 which in turn is mounted on a shaft 43 journally supported within the housing 38. A key 44 joins the worm gear 42 to the shaft 43 for joint rotation of the gear and shaft. A gear member 45 is mounted adjacent the worm gear 42 and is similarly fixed to the shaft 43 by means of a key 46. It will thus be understood that by means of a continuously running power take-off shaft 37 from a pulling tractor, the several gears in the gear box 38 will be continuously driven. The gear member 45 is provided with an internal annular ring of gear teeth 47. A shaft 48 is journaled in the gear housing 38 in a position parallel to and spaced above the shaft 43. A pinion gear 49 is carried on the inner end of the shaft 48 and engages the internal annular teeth 47 of the gear member 45. A key 50 is provided for holding the pinion 49 to the shaft 48 for concurrent rotation.

The baler of this invention includes a scoop shovel type of platform 51 having a spring tooth pick-up cylinder 52 mounted across the forward lower end thereof. An upwardly and rearwardly running slatted conveyor 53 at its forward end is mounted centrally of the spring tooth pick-up cylinder. A shaft 54 journaled in the lower forward end of the platform is adapted to carry the cylinder 52 and the lower forward end of the slatted conveyor 53. As best shown in Fig. 3 a shaft 55 journaled in the platform 51 is adapted to carry the upper end of the slatted conveyor 53. The platform 51 comprises a throat portion 56 at the upper end thereof adjacent the shaft 55. Upper and lower cooperative feed rolls 57 and 58 are mounted within the throat portion 56 of the scoop shovel platform 51 and are adapted to convey material picked up by the pick-up cylinder 52 and the slatted conveyor 53 from the platform through a passage 59 in back of the rolls and forwardly of a transversely disposed bale chamber 60. Spaced sprockets 61 and 62 are mounted on the shaft 55 to carry the slatted conveyor 53 and similarly spaced sprockets 63 are mounted on the lower shaft 54 for carrying the lower forward end of the slatted conveyor 53.

The upper feed roll 57 is mounted on a shaft 64 and similarly the lower feed roll 58 is carried on a shaft 65. Transversely spaced arms 66 and 67 carry the upper feed roll 57 and shaft 64. The lower feed roll 58 and its shaft 65 are carried on transversely spaced arms 68 and 69. The rolls 57 and 58, as previously stated, are mounted within the throat portion of the platform 51 and are further contained within the side walls 70 and 71 which form the sides of the throat 56 and passage 59 extending between the rolls and the cylindrical bale chamber 60. A stub shaft 72 is journaled in the side wall 71 and pivotally carries the roller carrying arms 67 and 69. A shaft 73 is axially aligned with the stub shaft 72 and is journaled in the side wall 70 and pivotally carries the roller supporting arms 66 and 68 as best shown in Figs. 4 and 5. The shaft 73 also carries side-by-side V-belt pulleys 74 and 75 fastened thereto so that rotation of the shaft will effect rotation of the pulleys. A V-belt pulley 76 is fastened to the upper roller shaft 64. The pulley 76 is in alignment with the pulley 74 on the shaft 73 and by means of a V-belt 78 the pulleys are joined for imparting drive from the shaft 73 to the roll 57. A V-belt 79 joins the aligned pulleys 75 and 77 and similarly imparts drive from the shaft 73 to the lower roll 58. Coil springs 80 and 81 are disposed over and on the roll shaft 64 and urge the roll 57 downwardly by a mechanical reactance against the top 82 of the platform throat. Coil springs 83 and 84 are disposed beneath the roller shaft 75 and are adapted to react against angle members 85 and 86 mounted on the side walls 70 and 71 respectively so that the roll 58 is urged upwardly against the upper cooperative roll 57. Thus material passing through the rolls must of necessity spread the rolls against the action of the spring members 80, 81, 83, and 84.

As best shown in Fig. 4 a gear 87 is fastened to the constantly driven shaft 43 and is in meshing engagement with a gear 88 fastened to the outer end of the shaft 55 for the purpose of imparting drive from the tractor power take-off to the conveyor 53. A small spur gear 89 is fastened to the outer end of a shaft 90 which is in axial alignment with the shaft 73 journally mounted in the side wall 70 of the platform throat.

The shaft 90 is carried in a bearing 91 which in turn is fastened to the side sheet 70 by means of a strap 92 by riveting or other suitable means 93. The shaft 90 is provided with a fixed clutch part 94 for cooperative clutching engagement with a clutch part 95 splined to the axially aligned shaft 73. The clutch part 95 is provided with an annular groove 96 for engagement by a shifting fork 97 for the purpose of effecting sliding of the clutch part 95 along the splined portion 98 of the shaft 73. The shifter fork 97 is pivoted on a bracket 99 fixed to the side sheet 70. A rearward extension 100 of the shifter fork 97 terminates in a ball joint 101 for joining a link 102 which is attached at its other end to a transversely and reciprocably slidable bar member 103 by means of a hinge pin joint 104.

A sprocket 105 spaced from the gear 87 is also mounted for fixed rotation on the constantly driven shaft 43. A chain 106 joins the sprocket 105 with a sprocket 107 fixed to a shaft 108 later to be described as the compressor auger carrying shaft. A sprocket 109 adjacent the sprocket 107 is similarly fixed to the shaft 108 and by means of a chain 110 drive is imparted to a sprocket 111 fastened to a shaft 112. An integral bearing and support 113 is mounted on the supporting structure 30 and carries the outwardly extending end of the shaft 43 adjacent the sprocket 105.

As best shown in Figs. 7 and 8 a material compressing auger 114 is mounted on the shaft 108 within the housing 60. That portion of the shaft within the housing 60 has an enlarged diameter as shown at 115. The shaft with an unsupported inner end is carried by spaced bearings 116 and 117 at its outer end adjacent the sprockets 107 and 109. A rectangularly shaped opening 118 in the arcuate front of the cylindrical housing 60 provides the entranceway for material delivered through the feed rolls to the compressing chamber. A knife edge 119 extends along the arcuate, generally vertical left-hand side of the opening 118 as viewed in Fig. 7 and cooperates with a knife edge 120 on the outer peripheral edge of the auger flight 114 to shear material passing from the chamber 59 immediately behind the feed rolls through the opening 118 into short lengths in a manner conducive to more compact and dense bales. The extent of the knife edge 119 is shown in Fig. 3. The knife edge 120 on the periphery of the auger flight cooperates with the knife edge 119 on the periphery of the opening to positively shear material as it passes through the opening 118. Fig. 9 shows a sectional view through the cooperating knife edges 119 and 120.

The bale forming chamber 60 includes a rotatable drum like portion 121 which receives material from the open unjournalled end 122 of the auger 114 for the purpose of compacting the material in a bale form. A sprocket 123 is formed integrally around a central portion of the rotatable drum member 121. Guide tracks 124 and 125 are annularly disposed around the ends of the rotatable chamber 121 which is equal in length to the length of the formed and eventually tied bales. A plurality of guide rollers 126, 127, 128, 129, 130, and 131 carried on the supporting structure 30 are so arranged that they cooperate with the annular guide tracks 124 and 125 at suitably spaced positions around the periphery of the cylindrical drum so that with the aid of means to drive the integral sprocket 123 the drum will be rotatable and maintain its position in axial alignment with the bale forming chamber 60 for the reception of material from the open end compressing auger 114. The guide rollers 126 and 127 are adapted for cooperation with tracks 124 and 125 and are located at the lower front side of the bale chamber. The guide rollers 128 and 129 are similarly adapted for cooperation with tracks 124 and 125 and are positioned at the lower rear side of the bale chamber. The rollers 130 and 131 are disposed at the top center of the chamber for cooperation with the tracks 124 and 125. It will be noted that these guide rollers substantially form isosceles triangles and thus adequately and properly support the rotating portion 121 of the bale chamber 60. Arcuate bracket members 132 and 133 are adapted to carry the upper guide rollers 130 and 131 respectively. The brackets are supported on the supporting structure 30. In addition to the arcuate brackets 132 and 133 the front guide rollers 126 and 127 are mounted on spaced brackets 134 and 135 and similarly the rollers disposed at the rear side of the chamber are carried on spaced brackets 136. End thrust rollers 137 and 138 are mounted on brackets 134 and 135 respectively and act against the side surfaces of the annular guide tracks 124 and 125 to assist the guide rollers in holding the rotatable section 121 of the bale chamber 60 against endwise longitudinal movement. End thrust rollers 139 comparable to the rollers 137 and 138 are mounted on the brackets 136 and are arranged and constructed to engage the sides of the annular tracks 124 and 125 to aid in the maintenance of the rotatable drum against endwise displacement.

As best shown in Figs. 10 and 11 the drum portion 121 of the bale chamber 60 is provided with diametrically opposed back pressure plates 140 and 141 which are formed integrally at and with the discharge end 142 of the rotating bale chamber 121. Bracket members 143 and 144 are attached to the wall of the chamber 121 and are equipped with portions thereof spaced outwardly from the surface of the drum. These bracket members 143 and 144 are located respectively adjacent the back pressure plates 140 and 141. Screw members 145 and 146 threadedly engage the brackets 143 and 144 respectively and are adapted to engage the back pressure plates 140 and 141 for the purpose of adjusting their position inwardly or outwardly as desired. It is apparent that when the screws 145 and 146 are turned inwardly there is a greater back pressure built up on the bale material with a resultant denser and heavier bale. Lock nuts 147 and 148 engage the screws 145 and 146 respectively to hold the screws and thus the back pressure plates in their adjusted positions.

A chain 149 engages the large drum sprocket 123 at one end and at its other end engages a sprocket 150 which in turn is mounted on a shaft 151. Means are provided for intermittently driving the shaft 151 from the gear box 38 to effect intermittent rotational drive of the chamber 121. A clutch 152 as best shown in Fig. 12 is positioned intermediate the aligned shafts 48 and 151 and it will thus be understood that when the clutch is in engagement drive to the gear 150 and thus the rotatable drum 121 of the bale chamber 60 will be accomplished simultaneously with the rotation of the spur gear 49 engaging the internal annular gear teeth 47 on the gear member 45. The clutch 152 includes a clutch part 153 splined to the shaft 151 for axial sliding movement and concurrent rotation. An annular groove 154 is provided in this clutch part 153 and by means of a shifter fork 155 the clutch part 153 is moved axially along the shaft 151. The shifter fork 155 is pivoted at 156 on a bracket 157 fixedly attached to the gear box or housing 38. A cooperative clutch part 158 is fastened to the aligned shaft 48 and is adapted to receive engagement of the clutch part 153 when the clutch part 153 is moved axially to the inner end of the splined shaft 151. The shaft 151 is supported in a bearing 159 which in turn is carried on a bracket 160 extending upwardly from the supporting structure 30.

A link 161 joins one end of the transversely slidable bar 103 and an upward extension 162 of the shifter fork 155 brings about a direct mechanical engagement of the bar 103 with the clutch 152. A spring 163 is attached to the bar 103 at 164 and to the gear housing at 165 to cause a normal urging of the bar 103 in a direction toward the clutch 152.

As best shown in Fig. 13, a bale engaging star wheel 166 is carried on a vertically disposed shaft 167 which as shown in Fig. 1 is mounted in an upper bracket 168 and a lower bracket 169 which form upper and lower bearings for the shaft 167. A sprocket 170 is fixed to the shaft 167 and a chain 171 joins the sprocket 170 with a sprocket 172 which in turn is fixed to a shaft 173. A bearing bracket 174 is provided for the upper end of the shaft 173 as best shown in Figs. 1 and 2. The bracket 174 is carried on supporting structure 30. A journal mounting 175 is provided in the top side of the gear box 38 for receiving the lower end of the shaft 173.

A rotor 176, as shown in Fig. 12, is fastened to the shaft 173 intermediate the gear 172 and the gear box 38 and disposed directly above the sliding bar member 103. The shaft 173 passes upwardly through the bar 103 through an elongated slot 177 to permit limited longitudinal sliding movement of the bar 103. A pin 178 is threadedly fixed at 179 in the top of the gear housing 38 at a position spaced apart from the shaft 173 and in transverse alignment therewith.

The rotor member 176 is provided with a humped cam member 180 on the top surface thereof. The rotor 176 further has an open radial slot 181 for the purpose of receiving a roller 182 which is journally mounted on a transversely slidable bar 103. The roller 182 is adapted to ride on the peripheral surface of the rotor 176 until the radial slot 181 comes into alignment with the roller 182 whereupon the spring 163 causes the bar 103 to move longitudinally with the roller sliding into the open radial slot.

The bar 103, as best shown in Figs. 12 and 13, is provided with spaced post members 183 and 184 for the purpose of journally carrying a rod 185 disposed parallel to and spaced above the bar 103. This rod member 185 is journaled in the upper ends of the spaced posts 183 and 184 and is provided at one end with a depending finger 186. This depending finger 186 constitutes a cam follower for the humped cam member 180 extending upwardly from the surface of the rotor 176. The other end of the rod 185 has a depending finger 187 which extends downwardly slightly below the bar 103. A spring 188 is attached at one end to the rod 185 at 189 and at its other end 190 is placed against the post 184 for bearing reactance thereagainst. A notch 191 in the side of the bar 103 is provided for receiving the depending finger 187. The spring 188 normally urges the finger 187 into the notch 191. A projection or shoulder 192 is provided on the bar 103 adjacent the notch 191.

It will be apparent from an examination of the drawings that the position of the bar 103 will control the operation of the machine by either causing engagement of the feed roll clutch or the rotating drum clutch. In one endwise position of the bar 103 the feed roll clutch will be engaged and at the same time the rotating drum clutch will be disengaged. Similarly when the bar 103 is moved longitudinally to its other endmost position the situation will be reversed causing the rotating drum clutch to be engaged and the feed roll clutch to be disengaged.

As best shown in Figs. 1, 2 and 3, the wire tie strand used for tying the bales formed in this device is mounted in a plurality of spools 193, 194, 195, and 196. These spools are journaled for rotation on the surface of the cylindrical bale chamber 60 at spaced intervals around the circumference thereof. Holes 197, 198, 199, and 200 pass through the wall of the cylindrical bale chamber adjacent the spools 193, 194, 195 and 196 respectively for the purpose of passing the wire tie strand from the respective spools to the inside of the bale forming chamber. Wire guides 201, 202, 203, and 204 are fastened to the surface of the cylindrical bale chamber between each spool and its adjacent hole extending to the interior of the bale chamber. Set screws 205, 206, 207, and 208 engage the guide members 201, 202, 203, and 204 respectively to narrow the passage space in the guides and to thus vary the tension on the bale encircling wire strands.

In Fig. 1 the bale encircling strands are shown to extend longitudinally of the bale with a tie twist at the center portion of each end. The spools pass their wire strands through their guides and thence through their respective holes into the bale chamber at a location at the end of the compressing auger 114. The forward movement of succeeding material forced into the bale chamber causes the previously formed bales to move laterally to the side of the transversely disposed bale chamber causing the wires to extend along the sides of the bale whereupon rotation of the bale chamber 121 creates a wire twist 209 at the intersection of the four bale encircling wires at the center of the bale at the inner end thereof between the stationary portion 60 and the revolving portion 121 of the bale forming chamber. As best shown in Figs. 2, 10, 24, and 25, a cam 210 is provided on the revolving drum 121 of the bale chamber for the eventual purpose of limiting the number of twist rotations the drum shall make. A pair of spaced brackets 211 and 212 are fixed to the stationary portion of the bale chamber 60 relatively close to the rotating drum portion. A shaft 213 is journally mounted in the aligned spaced brackets 211 and 212. An arm 214 journaled on the shaft 213 is provided with a cam follower 215 at the outer end thereof. The cam follower 215 is in the form of a roller and is positioned in the path of the cam 210 on the revolving drum. Rotational movement of the drum thus causes an arcuate swinging movement of the arm 214 about the shaft 213 upon the cam follower 215 riding up and over the cam 210. A ratchet wheel 216 is fastened to the shaft 213 for concurrent rotation. A pawl 217 is hingedly mounted on the arm 214 at 218 and its outer end is adapted to engage the ratchet wheel 216. The device is thus arranged so that upon rotation of the drum one revolution or, in other words, as the cam follower 215 is raised by the cam 210, the pawl 217 on the cam follower carrying arm will cause a rotation of the ratchet wheel 216 one tooth and thus will simultaneously cause a rotation of the shaft 213 an angular distance equal to one tooth of the ratchet wheel. As shown in Fig. 24 the ratchet wheel has six teeth and thus the shaft 213 will be rotated one full revolution upon each six revolutions of the rotating drum 121.

A finger type cam 219 is fastened to the other end of the shaft 213 and is provided with a curved outer end 220 for causing swinging movement of an arm 221 which is hinged on a vertically disposed pin 222 carried on a bracket 223 fastened to the side wall 70 of the platform throat. Thus as the shaft 213 is rotated by the pawl and ratchet one ratchet tooth upon each revolution of the drum 121, the rotatable finger cam 219 by its curved end 220 causes an arcuate swinging movement of the arm 221.

The other end of the arm 221 designated by the numeral 224 has an upwardly bent portion 225 extending through an opening 226 in an actuator member 227.

The actuator member 227 is hinged at 228 to a bracket 229 which is supported on and fastened to the side of the shovel type pick-up platform as shown at 230. A spring 221a is anchored at one end on the supporting structure 70 and at the other end on the lever arm 221 thus normally urging the lever arm to a position such as shown in Fig. 25.

A cammed track 231 on the actuator member 227 is swingable into and out of position for engagement by a roller 232 mounted for free rotational movement on a vertically slidable arm 233 in a clutch 234. A spring 235 is attached at one end to a pin 236 at the upper end of the slidable arm 233 and is attached at its other end to the clutch housing 234 at 237.

The clutch 234 is carried on the constantly driven shaft 112. A cam rotor 238 is fixed to the driven shaft 112 and is provided with an inclined notch 239 in the periphery thereof. The notch 239 is further equipped with a drive shoulder 240 at one end thereof adapted to engage the depending arm 233 and thus impart rotational drive from the rotor 238 to the arm 233. A disk member 241 of the clutch 234 is provided with an annular flange 242 and a radially extending notch 243 therein to permit slidable passage of the arm 233 as best shown in Figs. 26 and 27. A shaft 244 in alignment with the shaft 112 forms an integral part of the disk 241 and the clutch 234 is adapted to intermittently impart rotational drive from the shaft 112 to the shaft 244. A housing 245 encloses the several clutch elements and by means of a cover plate 246 bolted to the housing at 247 the clutch operating mechanism is entirely enclosed.

A crank arm 248 is fixed to the shaft 244 and rotates therewith at the same intermittent intervals as for the rotation of the shaft 244. The direction of rotation of the shaft and crank arm is indicated by the arrow 249 as viewed in Fig. 19. A link member 250 is pivotally attached at one end at 251 to the outer end of the crank arm 248 and is pivotally attached at its other end at 252 to a wire cut-off member 253. The wire cut-off member 253 is adapted for reciprocating movement radially into and out of the bale chamber in order to effect a cut of the twisted wires 209 at the center thereof so that the one half of the wire twist will constitute the completed tie at the end of the bale and the other half of the tie will constitute the tie at the end of starting a new bale such as shown in Fig. 1. The wire cut-off member 253 is provided with a tubular housing guide 254 fastened to the outer wall of the bale chamber 60 by means of welding or other suitable attaching means such as shown at 255. An arm 256 depending from the pivotal attachment 252 at the outer end of the wire cut-off member 253 comprises a bell-crank with the connecting link 250 as best shown in Fig. 21. A fixed jaw 257 is formed on the inner end of the cut-off member 253 and cooperates with a pivoted cut-off jaw 258 hinged at 259 on the cut-off member 253 to provide a shearing of the wire twist. A rearward extension 260 is formed integrally with the pivoted cut-off jaw 258. A link 261 joins the rearward extension 260 and the bell-crank arm 256 whereupon angular swinging movement of the bell-crank arm 256 about its hinge 252 causes an opening and closing of the pivoted jaw 258 with respect to the fixed jaw 257 for shearing of the wire twist.

An actuator arm 262 is pivoted at 263 on a bracket support 264 carried on the supporting frame 30 at 265. The actuator arm 262 is arcuately swingable about its pivot 263 by reason of the camming action of the crank arm 248 in its rotational movement to cause driving of the wire twist cutting element. A lower extension 266 is provided on the arm 262. A spring 267 is attached to a pin 268 at the lower end of this downward extension 266 and to a pin 269 on the stationary supporting bracket 264. The spring 267 maintains close riding contact of the actuator arm 262 with the crank arm 248. A link 270 is pivotally attached at one end to the pin 269 and at its other end to one arm 271 of a bell-crank member 272 at 273. Arcuate swinging movement of the actuator arm 262 is thus transmitted through the link 270 to the bell-crank member 272.

The bell-crank member 272 is pivoted at 274 on a bracket member 275 which in turn is fixed to the supporting structure 30 as shown at 276. Another arm 277 of the bell-crank 272 is angularly disposed with respect to the first arm 271. A pawl 278 is pivoted at 279 to the outer end of the arm 277 and by means of a spring 280 arranged between the pawl 278 and the arm 277 the pawl is maintained in an extended position. The pawl 278 engages the shoulder 192 on the reciprocable bar 103 and it will be understood that rocking of the actuator arm 262 will cause the pawl to move the bar 103 in a rightward direction against the action of the spring 163. This causes a reengagement of the feed roll clutch elements 94 and 95 and a disengagement of the cylinder rotating clutch elements 153 and 158. Thus the machine operates in this manner until such time as the bale length measuring apparatus starts a new tie cycle by causing the depending arm 187 to kick the pawl 278 out from engagement with the shoulder 192 on the bar 103. This releases the hold on the bar 103 permitting the spring 163 to pull the bar in a leftward direction toward the gear housing 38 to accomplish disengagement of the feed roll clutch and engagement of the rotating drum clutch. It will thus be evident that as the bar 103 is moved in an endwise direction it alternately engages and disengages these clutch members so that at all times when one clutch is engaged the other is disengaged. When the baling machine is effecting a tie or wire twist by rotation of the bale chamber, the feed rolls are halted in their rotating operation, thus preventing additional material from being fed to the cylindrical bale chamber and interfering with the proper twisting of the bale encircling wires.

When the bales have been completely formed in the bale chamber 60 and have had their strand ends intertwisted by rotation of the drum 121, the bales are moved laterally outwardly by the incoming new material in the process of forming a succeeding bale. In Fig. 1 a bale 281 formed and tied in this machine is shown sliding outwardly on spaced slat members 282 which are carried on the supporting structure 30. The bale 281 being discharged supplies the back pressure to insure the formation of relatively dense bales. As shown, diametrically opposed compressor plate members 283 are provided adjacent the outer ends of the spaced slats 282 and are adapted to contact and resist passage of movement of the bale 281. These compressor plates are similar to those shown at the end of the revolving drum 121. The pressure plates 283 are adjustable inwardly and outwardly by means of threaded bolt members 284 which engage stationary bracket members 285. It will be understood that as the threaded bolt members are turned inwardly the compressor plates 283 are also moved inwardly to thus impose a greater pressure on the sides of the formed bale 281 with the ultimate result that succeeding bales are formed with a high density and contribute to tightly tied bales. Similarly, outward movement of threaded bale members 284 will permit greater freedom of movement of the discharging bales with the result that the succeeding bales being formed are less dense.

As shown in Fig. 1 the discharging bale 281 is provided with an outer end tie twist 286 which is one-half of the tie strand twist 209 formed at the inner end of a completed bale and which has been cut in half by the mechanism as shown in Figs. 20, 21, and 22. Each completed bale thus has a tie strand twist at both ends thereof and substantially located centrally of the formed cylindrical bale.

The operation of the device is as follows:

The compressing auger 114 is constantly turned causing a filling of the rotating drum portion 121 of the bale chamber 60 whereupon the star measuring wheel 166 will have rotated sufficiently to cause the cam hump 180, which immediately precedes the open slot 181 on the rotor 176, to rotate the finger actuator 186. As shown in Fig. 17 the throwout finger 187 has moved the pawl 278 away from the shoulder 192 permitting the spring 163 to pull the bar 103 in a leftward direction and thereupon just as soon as the open ended radial slot 181 of the rotor 176 comes into alignment and parallelism with the bar 103 the small roller 182 which has heretofore ridden around the periphery of the rotor 176 slides into the slot 181 and thus the bar 103 shifts to its extreme left position whereupon the feed rolls 57 and 58 have their drive disengaged by reason of the disengagement of the clutch elements 94 and 95 and the clutch 152 is simultaneously engaged whereupon the sprocket 150 is rotated imparting rotation to the drum 121 which continues to rotate until such time as the clutch 152 is again disengaged. As the drum rotates the tie strand wires extending lengthwise of the bale and within the bale chamber are naturally pulled inwardly about each other causing a twist at the center of the rotating bale chamber. The wires on the outside of the cylindrically shaped bale are pulled radially inwardly of the surface of the hay to prevent accidental slip-off of the wires. This feature is shown in the long expired patent to Vinton 1,260,605.

As the drum 121 rotates, the projecting lug thereon 210 trips the roller 215 on the end of the lever arm 214 on each revolution thereof and by reason of the pawl 217 the ratchet wheel 216 is caused to be rotated one tooth per each drum revolution. The ratchet wheel 216 imparts rotation to the cam 219 which engages and imparts a swinging pivotal movement to the arm member 221. The arm member 221 acts to shift a pivotally mounted member 227 thereupon permitting the radially disposed pin member 233 to drop and by reason of the action of the spring 235 ride on the outer periphery of a rotor 238 which is fastened to the constantly driven shaft 112. The rotor 238 has a notched portion 239 into which the pin 233 drops and causes concurrent rotation of the laterally extending shaft 244 with the shaft 112.

The crank arm 248 now rotates and moves in a direction indicated by the arrow 249 and acts to move the link arm 250 and the wire cut-off member 253 through the side wall of the bale chamber adjacent the juncture between the stationary portion and the rotating portion of the cylindrical bale chamber. Thus the wire cut-off member 253 projects into the bale chamber and the jaws 257 and 258 encircle the wire twist caused by the rotation of the drum portion 121 of the bale chamber 60 at a time when the drum is still rotating. If, for example, the bale chamber drum 121 were to be rotated six times then the timing of insertion of the wire cut-off member 253 should commence approximately at the fourth revolution of the drum. Continued rotation of the drum through the fifth and sixth revolutions provides a power means for withdrawing the wire cut-off means and simultaneously as the crank member 248 is rotated out of straight line relationship with the link 250, the connecting rod 261 is pulled causing a closing of the jaws 257 and 258 to effect a cutting of the wire twist at substantially the center of the length thereof. Simultaneously the crank arm 248 actuates the swingable arm 262 to thereupon impart movement to the pawl 278 to effect a movement of the bar 103 in a rightward direction to immediately disengage the clutch 152 and reengage the clutch elements 94 and 95 whereupon the cycle is repeated and the roller 182 again rides around the outer periphery of the radially slotted rotor wheel 176 during filling and compressing of a successive bale of hay.

The declutching of the clutch 234 is accomplished by the spring 221a urging lever to return to its original position and the roller 232 riding up on the inclined arm 231 of the pivotable member 227. This latter action causes the slide arm 233 to be pulled upwardly against the action of the spring 235.

It will be apparent that herein is provided a new type hay baler wherein an effective tie strand twist is accomplished by rotating a portion of the bale chamber with respect to a stationary portion thereof.

I am aware that numerous details of construction may be varied throughout a wide range without departing from the principles disclosed herein and I therefore do not propose limiting the patent granted hereon otherwise than as necessitated by the appended claims.

What is claimed is:

1. In a baler of the type having a bale forming chamber of which one portion is stationary and wherein another portion is rotatable and the baler has tie strand bale encircling wires adapted to be intertwisted upon rotation of said rotatable portion, and a wire cutting mechanism, cam means on the rotatable portion of the bale forming chamber, a movable cam journaled for rotational movement on the stationary portion of said bale forming chamber, actuating means on the stationary portion for moving the movable cam, said cam means on said rotatable portion arranged and constructed to engage said actuating means to rotate said movable cam, and clutch means operable by said movable cam to effect a movement of said cutting mechanism into and out of said bale chamber at the point of intertwisting of said bale encircling wires.

2. A baler as set forth in claim 1 in which the means arranged and constructed to rotate the movable cam includes an arm hinged for arcuate swinging movement on said stationary portion of the bale forming chamber, a ratchet wheel journaled on said stationary portion, a pawl hinged on said arm for engaging and rotating the ratchet wheel, a cam following roller mounted on the outer end of said arm, and in which said movable cam is directly connected to said ratchet wheel whereby rotation of the rotatable portion of the bale forming chamber directly controls the position of said movable cam.

References Cited in the file of this patent

UNITED STATES PATENTS

| Number | Name | Date |
|---|---|---|
| 452,287 | Sanders | May 12, 1891 |
| 668,736 | Killman | Feb. 26, 1901 |
| 841,882 | Muller | Jan. 22, 1907 |
| 1,184,082 | Dawson | May 23, 1916 |
| 1,250,702 | Foreman | Dec. 18, 1917 |
| 1,260,605 | Vinton | Mar. 26, 1918 |
| 1,470,321 | Cooper | Oct. 9, 1923 |
| 2,030,031 | Innes | Feb. 4, 1936 |
| 2,134,557 | Hilbish et al. | Oct. 25, 1938 |
| 2,157,261 | Innes | May 9, 1939 |
| 2,179,937 | Lamp | Nov. 14, 1939 |
| 2,236,628 | Nolt | Apr. 1, 1941 |
| 2,294,440 | Barker | Sept. 1, 1942 |
| 2,546,324 | Tuft | Mar. 27, 1951 |
| 2,578,609 | Stevens | Dec. 11, 1951 |

FOREIGN PATENTS

| Number | Country | Date |
|---|---|---|
| 241,330 | Switzerland | Feb. 28, 1946 |